US012603327B2

(12) United States Patent
Otsuka et al.

(10) Patent No.: US 12,603,327 B2
(45) Date of Patent: Apr. 14, 2026

(54) LITHIUM SECONDARY CELL

(71) Applicant: NGK INSULATORS, LTD.,
Nagoya-City (JP)

(72) Inventors: Haruo Otsuka, Ichinomiya-City (JP);
Tetsushige Yoshida, Nagoya-City (JP)

(73) Assignee: NGK INSULATORS, LTD., Nagoya
(JP)

( * ) Notice: Subject to any disclaimer, the term of this
patent is extended or adjusted under 35
U.S.C. 154(b) by 885 days.

(21) Appl. No.: 17/303,966

(22) Filed: Jun. 11, 2021

(65) Prior Publication Data

US 2021/0305631 A1 Sep. 30, 2021

Related U.S. Application Data

(63) Continuation of application No.
PCT/JP2020/001919, filed on Jan. 21, 2020.

(30) Foreign Application Priority Data

Feb. 27, 2019 (JP) ................................. 2019-034435

(51) Int. Cl.
*H01M 10/0585* (2010.01)
*H01M 4/38* (2006.01)
(Continued)

(52) U.S. Cl.
CPC ....... *H01M 10/0585* (2013.01); *H01M 4/382*
(2013.01); *H01M 4/583* (2013.01);
(Continued)

(58) Field of Classification Search
CPC .............................................. H01M 10/0585
See application file for complete search history.

(56) References Cited

U.S. PATENT DOCUMENTS 9,324,978 B2 4/2016 Kwon et al.
2003/0062259 A1* 4/2003 Mushiake .............. H01G 11/38
204/290.01
(Continued)

FOREIGN PATENT DOCUMENTS

EP 2 822 059 B1 3/2017
JP 2012-009193 A1 1/2012
(Continued)

OTHER PUBLICATIONS

International Search Report and Written Opinion (Application No.
PCT/JP2020/001919) dated Apr. 14, 2020.
(Continued)

*Primary Examiner* — Nicole M. Buie-Hatcher
*Assistant Examiner* — Krishna R Hammond
(74) *Attorney, Agent, or Firm* — BURR PATENT LAW,
PLLC

(57) ABSTRACT

In a lithium secondary cell, a positive electrode includes a
sheet-like positive current collector having conductivity and
a positive active material plate that is a plate-like ceramic
sintered body containing a lithium composite oxide. The
positive active material plate is bonded to the positive
current collector via a conductive bonding layer. The posi-
tive active material plate is penetrated by the conductive
bonding layer through a surface of the positive active
material plate facing the positive current collector. A pen-
etration depth of the conductive bonding layer in the positive
active material plate with respect to a direction of superpo-
sition is 3% or more and 80% or less of a thickness of the
positive active material plate.

7 Claims, 3 Drawing Sheets

(51) Int. Cl.
 H01M 4/583 (2010.01)
 H01M 4/62 (2006.01)
 H01M 4/66 (2006.01)
 H01M 10/0525 (2010.01)
 H01M 50/105 (2021.01)

(52) U.S. Cl.
 CPC ........... H01M 4/622 (2013.01); H01M 4/664
  (2013.01); H01M 10/0525 (2013.01); H01M
  50/105 (2021.01)

(56) References Cited

U.S. PATENT DOCUMENTS

| | | | |
|---|---|---|---|
| 2003/0231004 A1* | 12/2003 | Takahashi ........... | H01M 4/0404 |
| 2012/0009470 A1 | 1/2012 | Sugiura et al. | |
| 2012/0009471 A1* | 1/2012 | Sugiura .............. | H01M 4/0404 |
| | | | 429/211 |
| 2012/0115259 A1* | 5/2012 | Lee .................... | H01M 10/058 |
| | | | 438/795 |
| 2013/0252087 A1* | 9/2013 | Ozawa ................ | H01M 4/0404 |
| 2018/0108908 A1* | 4/2018 | Li | |
| 2019/0363357 A1 | 11/2019 | Yura et al. | |

FOREIGN PATENT DOCUMENTS

| | | | |
|---|---|---|---|
| JP | 2012-009194 A1 | | 1/2012 |
| JP | 2013-134865 A1 | | 7/2013 |
| JP | 5587052 B2 | | 9/2014 |
| KR | 20160041299 A | * | 4/2016 |
| WO | 2013/140932 A1 | | 9/2013 |
| WO | 2018/155155 A1 | | 8/2018 |

OTHER PUBLICATIONS

Written Opinion (Application No. PCT/JP2020/001919) dated Apr. 14, 2020 (with English translation).
Extended European Search Report (Application No. 20763962.6) dated Apr. 11, 2023.

* cited by examiner

LITHIUM SECONDARY CELL

CROSS REFERENCE TO RELATED APPLICATION

This present application is a continuation application of International Application No. PCT/JP2020/001919, filed on Jan. 21, 2020, which claims priority to Japanese Patent Application No. 2019-034435, filed Feb. 27, 2019. The contents of these application are incorporated herein by reference in their entirety.

TECHNICAL FIELD

The present invention relates to a lithium secondary cell.

BACKGROUND ART

Conventionally, as a positive active material layer in a lithium secondary cell (also referred to as a lithium ion secondary cell), a powder-dispersed positive active material layer is known, which is obtained by molding a kneaded mixture of powder of a lithium composite oxide (i.e., a lithium transition metal oxide), a binder, a conductive agent, and the like.

In the lithium secondary cell of Japanese Patent Publication No. 5587052 (Document 1), proposed is a technique for increasing the capacity of the positive electrode by using a lithium composite oxide sintered plate as the positive active material layer bonded to the positive current collector. The sintered plate is bonded to the positive current collector via a conductive bonding layer. In the non-aqueous electrolyte cell of Japanese Patent Application Laid-Open No. 2013-134865 (Document 2), a plurality of ceramic films which are an active material layer are bonded to a conductive core material via a carbon layer containing a conductive carbon material and a binder.

In a lithium secondary cell as in Document 1, in order to firmly bond the sintered plate, which is an active material plate, to the positive current collector, it is necessary to exert the anchor effect by sufficient penetration of the conductive bonding layer applied on the positive current collector into the active material plate. The same applies to the carbon layer in Document 2.

On the other hand, the inventors of the present application have found that if the amount of penetration of the conductive bonding layer into the active material plate is large, the cell characteristics of the lithium secondary cell may deteriorate.

SUMMARY OF INVENTION

The present invention is intended for a lithium secondary cell, and it is an object of the present invention to achieve both ensuring a bonding strength of the active material plate and suppressing deterioration of cell characteristics due to the conductive bonding layer.

The lithium secondary cell according to a preferred embodiment of the present invention includes a positive electrode, a separator arranged on the positive electrode in a predetermined direction of superposition, a negative electrode arranged on the separator on a side opposite to the positive electrode in the direction of superposition, an electrolytic solution with which the positive electrode, the negative electrode, and the separator are impregnated, and a sheet-like cell case that covers the positive electrode and the negative electrode from both sides in the direction of superposition and houses therein the positive electrode, the separator, the negative electrode, and the electrolytic solution. One electrode of the positive electrode and the negative electrode includes a sheet-like current collector having conductivity, and an active material plate that is a plate-like ceramic sintered body containing a lithium composite oxide, the active material plate being bonded to the current collector via a conductive bonding layer. The active material plate is penetrated by the conductive bonding layer through a surface of the active material plate facing the current collector. A penetration depth of the conductive bonding layer in the active material plate with respect to the direction of superposition is 3% or more and 80% or less of a thickness of the active material plate. According to the present invention, it is possible to achieve both ensuring a bonding strength of the active material plate and suppressing deterioration of cell characteristics due to the conductive bonding layer.

Preferably, the one electrode is the positive electrode, and the negative electrode includes a sheet-like negative current collector having conductivity, and a negative active material layer containing a carbonaceous material or a lithium-occluding material, the negative active material layer being applied as a coat on the negative current collector.

Preferably, the conductive bonding layer includes conductive powder, and a binder containing a resin and an aqueous solvent.

Preferably, the resin contained in the conductive bonding layer is an acrylic resin.

Preferably, the active material plate has a porosity of 25% or more and 45% or less.

Preferably, the lithium secondary cell is used as a power supply source of a sheet-like device or a device having flexibility.

Preferably, the lithium secondary cell is used as a power supply source of a smart card that is the device having flexibility.

These and other objects, features, aspects and advantages of the present invention will become more apparent from the following detailed description of the present invention when taken in conjunction with the accompanying drawings.

DESCRIPTION OF EMBODIMENTS

Figure 1:
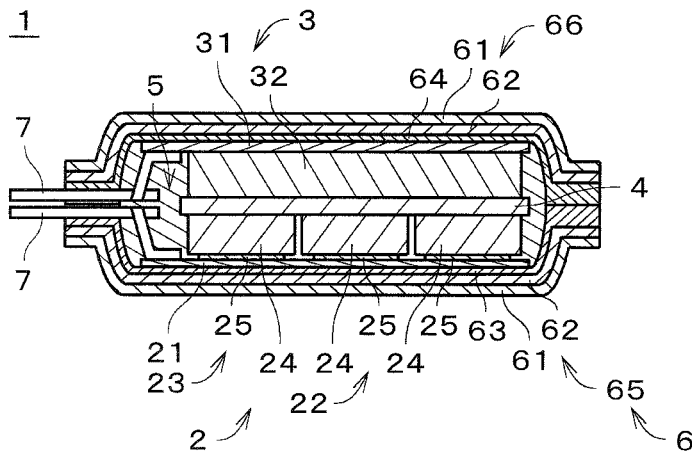
FIG. 1 is a sectional view of a lithium secondary cell according to one embodiment.
Figure 2:
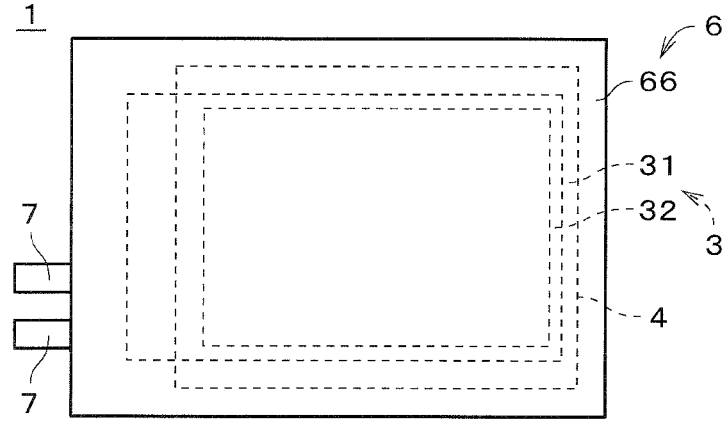
FIG. 2 is a plan view of the lithium secondary cell.

FIG. 1 is a sectional view illustrating a configuration of a lithium secondary cell 1 according to one embodiment of the present invention. FIG. 2 is a plan view of the lithium secondary cell 1. To facilitate understanding of the drawings, the lithium secondary cell 1 and its configuration are illustrated thicker in FIG. 1 than actual thicknesses. In FIG. 1, the widths of a positive electrode 2, a separator 4, and a negative electrode 3, which will be described later, in the right-left direction are also illustrated smaller than actual widths, and the widths of bonding portions of a cell case 6 in the right-left direction (i.e., both ends in the right-left direction in FIG. 1) are also illustrated greater than actual widths. Note that part of the structure on the front and back of the section is also illustrated in FIG. 1.

The lithium secondary cell 1 is a compact and thin cell. The lithium secondary cell 1 has, for example, a generally rectangular shape in plan view. In plan view, for example, the lithium secondary cell 1 has a longitudinal length of 10 mm to 46 mm and a lateral length of 10 mm to 46 mm. The lithium secondary cell 1 has a thickness (i.e., a thickness in the up-down direction in FIG. 1) of, for example, 0.30 mm to 0.45 mm and preferably 0.40 mm to 0.45 mm. The lithium secondary cell 1 is a sheet-like member or a thin plate-like member having flexibility. The sheet-like member as used herein refers to a thin member that becomes easily deformed by a relatively small force, and is also referred to as a film-like member. The same applies to the following description.

For example, the lithium secondary cell 1 is mounted on a sheet-like device or a device having flexibility and is used as a power supply source. The sheet-like device as used herein refers to a thin device that becomes easily deformed by a relatively small force, and is also referred to as a film-like device. In the present embodiment, the lithium secondary cell 1 is built in, for example, a smart card having an arithmetic processing function and is used as a power supply source of the smart card. The smart card is a card-type device having flexibility. For example, the smart card is used as a card with a fingerprint recognition function and a wireless communication function, the card including a wireless communication IC, an ASIC for fingerprint analysis, and a fingerprint sensor. In the following description, devices such as smart cards for which the lithium secondary cell 1 is used as a power supply source are also referred to as "target devices."

The lithium secondary cell 1 is mounted on a smart card by, for example, cold lamination in which pressure is applied at ordinary temperature or hot lamination in which pressure is applied with the application of heat. The processing temperature in the hot lamination is, for example, in the range of 110° C. to 260° C. In the hot lamination, the processing pressure is, for example, in the range of 0.1 mega-pascal (MPa) to 6 MPa, and the processing time (i.e., the heating and pressing time) is, for example, in the range of 10 to 20 minutes.

The lithium secondary cell 1 includes the positive electrode 2, the negative electrode 3, the separator 4, an electrolytic solution 5, the cell case 6, and two terminals 7. The positive electrode 2, the separator 4, and the negative electrode 3 are superposed in a predetermined direction of superposition. In the example illustrated in FIG. 1, the positive electrode 2, the separator 4, and the negative electrode 3 are laminated in the up-down direction in the drawing. In the following description, the "upper and lower sides in FIG. 1" are simply referred to as the "upper and lower sides." The "up-down direction in FIG. 1" is simply referred to as the "up-down direction" or also referred to as the "direction of superposition." The up-down direction in FIG. 1 does not necessarily have to match an actual up-down direction when the lithium secondary cell 1 is mounted on a target device such as a smart card.

In the example illustrated in FIG. 1, the separator 4 is arranged on the upper face of the positive electrode 2 in the up-down direction (i.e., the direction of superposition). The negative electrode 3 is arranged on the upper face of the separator 4 in the up-down direction. In other words, the negative electrode 3 is arranged on the separator 4 on the side opposite to the positive electrode 2 in the up-down direction. The separator 4 and the negative electrode 3 each have, for example, a generally rectangular shape in plan view. The shape of the positive electrode 2 will be described later.

The cell case 6 is a sheet-like and bag-shaped member. The cell case 6 has a generally rectangular shape in plan view. The cell case 6 includes two-layer sheet portions 65 and 66 superposed in the up-down direction. In the following description, the sheet portion 65 located on the lower side of the positive electrode 2 is referred to as a "first sheet portion 65," and the sheet portion 66 located on the upper side of the negative electrode 3 is referred to as a "second sheet portion 66." The outer peripheral edge of the first sheet portion 65 and the outer peripheral edge of the second sheet portion 66 are bonded together by, for example, so-called heat seal. For example, the first sheet portion 65 and the second sheet portion 66 of the cell case 6 are each formed of a laminate film in which metal foil 61 formed of a metal such as aluminum (Al) and an insulating resin layer 62 are laminated on each other. In the first sheet portion 65 and the second sheet portion 66, the resin layer 62 is located on the inner side of the metal foil 61.

The cell case 6 covers the positive electrode 2 and the negative electrode 3 from both sides in the up-down direction. The cell case 6 houses therein the positive electrode 2, the separator 4, the negative electrode 3, and the electrolytic solution 5. The electrolytic solution 5 is continuously present around the positive electrode 2, the separator 4, and the negative electrode 3. In other words, the electrolytic solution 5 is present between the positive electrode 2 and the negative electrode 3. The positive electrode 2, the separator 4, and the negative electrode 3 are impregnated with the electrolytic solution 5. The two terminals 7 extend outward from the inside of the cell case 6. Inside the cell case 6, one of the terminals 7 is electrically connected to the positive electrode 2, and the other terminal 7 is electrically connected to the negative electrode 3.

The positive electrode 2 includes a positive current collector 21, a positive active material plate 22, and a conductive bonding layer 23. The positive current collector 21 is a sheet-like member having conductivity. The lower face of the positive current collector 21 is bonded to the resin layer 62 of the cell case 6 via a positive bonding layer 63. The positive bonding layer 63 is formed of, for example, a mixture of resins including an acid-modified polyolefin resin and an epoxy resin. The positive bonding layer 63 may be formed of any of other various materials. The positive bonding layer 63 has a thickness of, for example, 0.5 μm to 10 μm.

For example, the positive current collector 21 includes metal foil formed of a metal such as aluminum and a conductive carbon layer laminated on the upper face of the metal foil. In other words, the main surface of the positive current collector 21 that faces the positive active material plate 22 is covered with the conductive carbon layer. The aforementioned metal foil may be formed of any of various metals other than aluminum (e.g., copper, nickel, silver, gold, chromium, iron, tin, lead, tungsten, molybdenum, titanium, zinc, or an alloy containing any of these metals). Note that the aforementioned conductive carbon layer may be omitted from the positive current collector 21.

The positive active material plate 22 (i.e., the active material plate of the positive electrode 2) is a relatively thin plate-like ceramic sintered body containing a lithium composite oxide. The positive active material plate 22 is bonded to the upper face of the positive current collector 21 via the conductive bonding layer 23. The positive active material plate 22 faces the separator 4 in the up-down direction. The upper face of the positive active material plate 22 is in contact with the lower face of the separator 4.

The positive current collector 21 has a thickness of, for example, 9 μm to 50 μm, preferably 9 μm to 20 μm, and more preferably 9 μm to 15 μm. The positive active material plate 22 has a thickness of, for example, 15 μm to 200 μm, preferably 30 μm to 150 μm, and more preferably 50 μm to 100 μm. By increasing the thickness of the positive active material plate 22, it is possible to increase the capacity of the active material per unit area and to increase the energy density of the lithium secondary cell 1. By reducing the thickness of the positive active material plate 22, it is possible to suppress deterioration of cell characteristics (in particular, an increase in resistance value) accompanying the repetition of charging and discharging. The conductive bonding layer 23 has a thickness (i.e., a thickness of a portion of the conductive bonding layer 23 positioned between the lower face of the positive active material plate 22 and the upper face of the positive current collector 21) of, for example, 1 μm to 28 μm and preferably 5 μm to 25 μm.

The positive active material plate 22 has a structure in which (many) primary particles are coupled together. The primary particles are composed of a lithium composite oxide having a layered rock-salt structure. The lithium composite oxide is typically an oxide expressed by the general formula: $Li_pMO_2$ (where $0.05 < p < 1.10$), where M is at least one of transition metals and, for example, contains one or more selected from the group consisting of cobalt (Co), nickel (Ni), and manganese (Mn). The layered rock-salt structure as used herein refers to a crystal structure in which a lithium layer and a transition metal layer other than lithium are alternately laminated one above another with an oxygen layer sandwiched therebetween. That is, the layered rock-salt structure is a crystal structure in which a transition metal ion layer and a sole lithium layer are alternately laminated via oxide ions (typically, a-$NaFeO_2$-type structure in which a transition metal and lithium are regularly arranged in the axial direction of a cubic rock-salt structure).

Preferable examples of the lithium composite oxide having a layered rock-salt structure include lithium cobalt oxides ($Li_pCoO_2$) where $1 \le p \le 1.1$, lithium nickel oxides ($LiNiO_2$), lithium manganese oxides ($Li_2MnO_3$), lithium nickel manganese oxides ($Li_p(Ni_{0.5}, Mn_{0.5})O_2$), solid solutions expressed by the general formula: $Li_p(Co_x, Ni_y, Mn_z)O_2$ where $0.97 \le p \le 1.07$ and $x+y+z=1$, solid solutions expressed by $Li_p(Co_x, Ni_y, Al_z)O_2$ where $0.97 \le p \le 1.07$, $x+y+z=1$, $0 < x \le 0.25$, $0.6 \le y \le 0.9$, and $0 < z \le 0.1$, and solid solutions of $Li_2MnO_3$ and $LiMO_2$ where M is a transition metal such as Co or Ni. In particular, the lithium composite oxide is preferably a lithium cobalt oxide $Li_pCoO_2$ where $1 \le p \le 1.1$ and, for example, $LiCoO_2$ (LCO).

The positive active material plate 22 may further contain one or more of elements such as magnesium (Mg), aluminum, silicon (Si), calcium (Ca), titanium (Ti), vanadium (V), chromium (Cr), iron (Fe), copper (Cu), zinc (Zn), gallium (Ga), germanium (Ge), strontium (Sr), yttrium (Y), zirconium (Zr), niobium (Nb), molybdenum (Mo), silver (Ag), tin (Sn), antimony (Sb), tellurium (Te), barium (Ba), and bismuth (Bi). Alternatively, the positive active material plate 22 may be subjected to sputtering using gold (Au) or the like as a current-collecting assistant.

In the positive active material plate 22, for example, the aforementioned primary particles have a mean particle diameter (i.e., a primary particle diameter) less than or equal to 20 μm and preferably less than or equal to 15 μm. The primary particle diameter is also, for example, greater than or equal to 0.2 μm and preferably greater than or equal to 0.4 μm. The primary particle diameter can be measured by analyzing a scanning electron microscope (SEM) image of a section of the positive active material plate 22. Specifically, for example, the positive active material plate 22 is processed by a cross-section polisher (CP) to expose a polished section, and this polished section is observed with an SEM at a predetermined magnification (e.g., 1000× magnification) with a predetermined field of view (e.g., 125 μm×125 μm). At this time, the field of view is set such that 20 or more primary particles are included in the field of view. Then, for every primary particle in a resultant SEM image, the diameter of a circumscribed circle drawn from the primary particle is obtained, and an average value of the obtained diameters is assumed to be the primary particle diameter.

In the positive active material plate 22, the primary particles preferably have an average inclination angle (i.e., an average orientation angle) greater than 0° and less than or equal to 30°. The average inclination angle is also more preferably greater than or equal to 5° and less than or equal to 28° and yet more preferably greater than or equal to 10° and less than or equal to 25°. The average inclination angle is an average value of angles formed by the (003) planes of the primary particles and the main surface of the positive active material plate 22 (e.g., the lower face of the positive active material plate 22).

The inclination angles of the primary particles (i.e., the angles formed by the (003) planes of the primary particles and the main surface of the positive active material plate 22) can be measured by analyzing a section of the positive active material plate 22 by electron backscatter diffraction (EBSD). Specifically, for example, the positive active material plate 22 is processed by a cross-section polisher to expose a polished section, and this polished section is analyzed by EBSD at a predetermined magnification (e.g., 1000× magnification) with a predetermined field of view (e.g., 125 μm×125 μm). In a resultant EBSD image, the inclination angle of each primary particle is expressed by the shades of colors, i.e., a darker color indicates a smaller inclination angle. Then, an average value of the inclination angles of the primary particles obtained from the EBSD image is assumed to be the aforementioned average inclination angle.

Among the primary particles constituting the positive active material plate 22, the proportion of primary particles having inclination angles greater than 0° and less than or equal to 30° is preferably higher than or equal to 60%, more preferably higher than or equal to 80%, and yet more preferably higher than or equal to 90%. There are no particular limitations on the upper limit of this proportion, and the proportion may be 100%. In the aforementioned EBSD image, this proportion can be obtained by obtaining a total area of the primary particles whose inclination angles are greater than 0° and less than or equal to 30° and dividing this total area of the primary particles by a total area of all the primary particles.

The positive active material plate 22 has a porosity of, for example, 25% or more and 45% or less. The porosity of the positive active material plate 22 as used herein refers to a volume ratio of pores (including open pores and closed pores) of the positive active material plate 22. This porosity can be measured by analyzing an SEM image of a section of the positive active material plate 22. For example, the positive active material plate 22 is processed by a cross-section polisher to expose a polished section. This polished section is observed with an SEM at a predetermined magnification (e.g., 1000× magnification) with a predetermined field of view (e.g., 125 µm×125 µm). A resultant SEM image is analyzed to obtain the porosity (%) by dividing the total area of all the pores in the field of view by the area (cross-sectional area) of the positive active material plate 22 in the field of view and multiplying the obtained value by 100. The porosity may be less than 25%, or may be higher than 45%.

An average value of the diameters of the pores included in the positive active material plate 22, i.e., a mean pore diameter, is, for example, less than or equal to 15 µm, preferably less than or equal to 12 µm, and more preferably less than or equal to 10 µm. The mean pore diameter is also, for example, greater than or equal to 0.1 µm and preferably greater than or equal to 0.3 µm. The aforementioned diameter of the pore is typically the diameter of sphere when the pore is assumed to be the sphere having the same volume or the same cross-sectional area as the pore. The mean pore diameter is obtained by calculating an average value of the diameters of pores on the basis of the number of pores. The mean pore diameter can be obtained by, for example, analysis of a sectional SEM image or a known method such as mercury intrusion porosimetry. Preferably, the mean pore diameter is measured by mercury intrusion porosimetry using a mercury porosimeter.

The conductive bonding layer 23 includes conductive powder and a binder. Examples of the conductive powder include powder of acetylene black, scaly natural graphite, carbon nanotubes, carbon nanofibers, carbon nanotube derivatives, and carbon nanofiber derivatives. The binder contains, for example, a resin and a solvent. The resin is, for example, an acrylic resin. The solvent is, for example, an aqueous solvent such as water. The acrylic resins contained in the binder may be of one kind, or may be of two or more kinds. The binder may contain another resin (e.g., a polyimide amide resin) in addition to or instead of the acrylic resin. The solvent contained in the binder may be a solvent other than the aqueous solvent (e.g., an organic solvent).

The conductive bonding layer 23 is formed by, for example, applying as a coat a liquid or paste adhesive containing the conductive powder and the binder described above to the positive current collector 21 or the positive active material plate 22 and evaporating the solvent between the positive current collector 21 and the positive active material plate 22 to solidify the adhesive.

Figure 3:
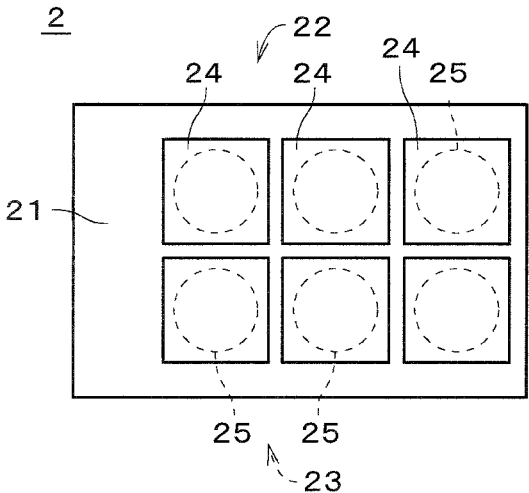
FIG. 3 is a plan view of a positive electrode.

FIG. 3 is a plan view of the positive electrode 2. In the example illustrated in FIGS. 1 and 3, the positive active material plate 22 includes active material plate elements 24 having almost the same structure. The active material plate elements 24 are arranged in a matrix (i.e., in grid form) on the positive current collector 21. Each active material plate element 24 has, for example, a generally rectangular shape in plan view. In plan view, the active material plate elements 24 have almost the same shape (i.e., almost the same form and almost the same dimensions) and are spaced from one another. The active material plate elements 24 may have different shapes.

In the example illustrated in FIG. 3, six generally square active material plate elements 24 are arranged in a matrix of 2 vertical×3 horizontal in plan view. The length of one side of each active material plate element 24 in plan view is, for example, 5 mm to 40 mm. The number and arrangement of the active material plate elements 24 may be changed in various ways. The shape of each active material plate element 24 may be changed in various ways.

In the example illustrated in FIGS. 1 and 3, the active material plate elements 24 of the positive active material plate 22 are respectively bonded to the positive current collector 21 by bonding layer elements 25 of the conductive bonding layer 23. The compositions of the bonding layer elements 25 are substantially the same. In FIG. 3, the outline (i.e., the outer edge) of each bonding layer element 25 of the conductive bonding layer 23 is shown by a broken line. For example, the number of the bonding layer elements 25 is the same as the number of the active material plate elements 24. The bonding layer elements 25 are arranged between the positive current collector 21 and the active material plate elements 24 in the up-down direction, respectively. In the positive electrode 2, one active material plate element 24 may be bonded to the positive current collector 21 by two or more bonding layer elements 25.

The shape of each bonding layer element 25 in plan view is, for example, generally circular. In plan view, each bonding layer element 25 is smaller than the active material plate element 24, and the entire bonding layer element 25 is covered with the active material plate element 24. That is, in plan view, the entire outer edge of the bonding layer element 25 is located inside the outer edge of the active material plate element 24. In other words, each bonding layer element 25 does not protrude around the active material plate element 24. The shape of the bonding layer element 25 in plan view is not limited to a generally circular shape, and may be changed to various shapes such as a generally oval shape and a generally elliptical shape.

The positive active material plate 22 is penetrated by the conductive bonding layer 23 through the lower surface of the positive active material plate 22 (i.e., the surface facing the positive current collector 21). The penetration depth of the conductive bonding layer 23 in the positive active material plate 22 in the up-down direction is 3% or more and 80% or less of the thickness of the positive active material plate 22 in the up-down direction. In the following description, the value obtained by dividing the penetration depth of the conductive bonding layer 23 by the thickness of the positive active material plate 22 is also referred to as "penetration percentage." That is, in the lithium secondary cell 1, the penetration percentage of the conductive bonding layer 23 in the positive active material plate 22 is 3% to 80%. The penetration percentage is preferably 6% to 75%.

Figure 4:
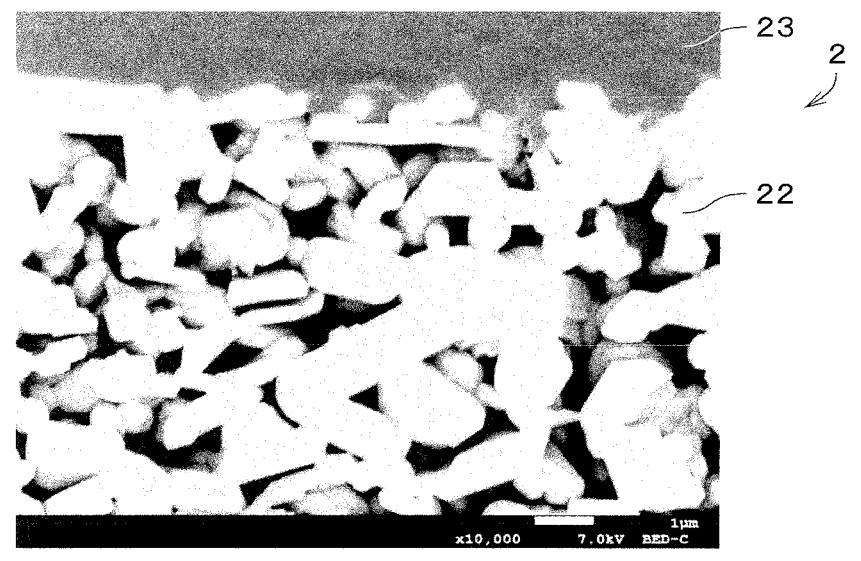
FIG. 4 is an SEM image of a section of a positive active material plate.
Figure 5:
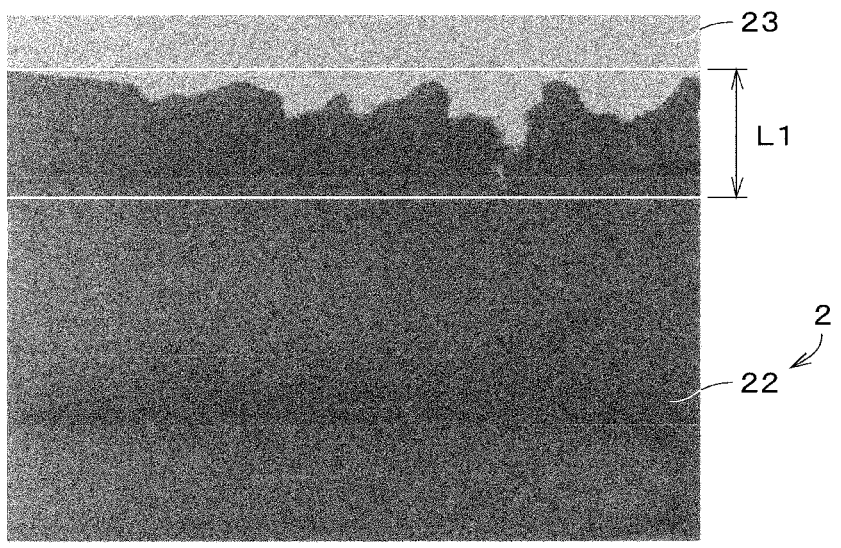
FIG. 5 is a two-dimensional mapping image of carbon in the section of the positive active material plate.

The penetration percentage can be obtained as follows. First, the positive active material plate 22 is processed by a cross-section polisher to expose a polished section. This polished section is observed with an SEM at a predetermined magnification (e.g., 1000× magnification), and thus the thickness of the positive active material plate 22 is obtained. As illustrated in FIG. 5, a two-dimensional mapping image of carbon (C) is generated by EDS (energy dispersive X-ray analysis) with respect to the portion in the vicinity of the boundary between the positive active material plate 22 and the conductive bonding layer 23 shown in the SEM image of FIG. 4. The top and bottom of FIGS. 4 and 5 are reversed from the top and bottom of FIG. 1. In FIG. 5, the region having a light density (the red region in the actual image) located on the upper side in the drawing is the existence region of carbon contained in the conductive bonding layer 23. The region having a dark density (the black region in the actual image) located on the lower side in FIG. 5 is the region where the conductive bonding layer 23 does not exist, that is, the existence region of the particles constituting the positive active material plate 22 and the pores.

Subsequently, in the two-dimensional mapping image, measured is a distance L1 from the surface of the positive active material plate 22 facing the positive current collector 21 (i.e., the upper surface of the positive active material plate 22 in FIG. 5) to the innermost part in the existence region of carbon inside the positive active material plate 22 (i.e., the lower end of the existence region of carbon in FIG. 5). Next, the distance L1 is divided by the thickness of the positive active material plate 22, and the obtained value is multiplied by 100 to obtain a temporary value of the penetration percentage (%). Then, at a predetermined number of arbitrary points on the positive active material plate 22, the thicknesses of the positive active material plate 22 and the above-mentioned distance L1 are measured to obtain temporary values of the penetration percentage, and the arithmetic mean of the predetermined number of the temporary values is obtained as the penetration percentage of the conductive bonding layer 23. In the present embodiment, the above-mentioned predetermined number is 5 points for each positive active material plate element 24 (that is, 30 points in total).

When the penetration percentage of the conductive bonding layer 23 in the positive active material plate 22 is large, the anchor effect of the conductive bonding layer 23 works greatly, and the bonding strength between the positive active material plate 22 and the positive current collector 21 is also large. From the viewpoint of preventing the positive active material plate 22 from peeling off from the positive current collector 21 during the manufacture of the lithium secondary cell 1 or the like, the bonding strength between the positive active material plate 22 and the positive current collector 21 is preferably 2 N/10 mm or more.

The bonding strength can be measured as follows. First, a positive active material plate 22 having a size of 10 mm×10 mm in plan view is prepared. Subsequently, an adhesive to become a conductive bonding layer 23 is applied onto the positive current collector 21. The adhesive is applied so that the thickness after drying is 3 μm. Next, the positive active material plate 22 of 10 mm×10 mm is gently placed on the adhesive, and the adhesive is dried. After the adhesive becomes dried, a double-sided tape is attached to the positive active material plate 22, and the positive active material plate 22 is fixed to the pedestal of a peel tester. Then, a 180° peel test is performed at a peel speed of 120 mm/min to measure the bonding strength (N/10 mm).

When the penetration percentage of the conductive bonding layer 23 in the positive active material plate 22 is large, the cell characteristics tend to deteriorate. Specifically, as the penetration percentage increases, the capacity ratio indicating the rate characteristics of the lithium secondary cell 1 decreases. One reason for this is considered to be that the solvent component in the adhesive constituting the conductive bonding layer 23 permeates the positive active material plate 22 and the separator 4, and comes into contact with the negative electrode 3 (that is, the electrode opposite to the positive electrode 2 on which the conductive bonding layer 23 is provided) to be absorbed into the negative electrode 3. Another reason is considered to be that the increase in the penetration percentage increases the coverage area of the surface of the positive active material plate 22 by the conductive bonding layer 23 and inhibits the conduction of lithium ions. Further, when the negative electrode 3 is a coating electrode as described later, the negative electrode 3 may swell and deform (for example, warp) due to the solvent component coming into contact with and being absorbed into the negative electrode 3. Considering the practicality of the lithium secondary cell 1, the capacity ratio is preferably 80% or more.

As illustrated in FIG. 1, the negative electrode 3 includes a negative current collector 31 and a negative active material layer 32. The negative current collector 31 is a sheet-like member having conductivity. The upper face of the negative current collector 31 is bonded to the cell case 6 via a negative bonding layer 64. The negative bonding layer 64 is formed of, for example, a mixture of resins including an acid-modified polyolefin resin and an epoxy resin. The negative bonding layer 64 may be formed of any of other various materials. The negative bonding layer 64 has a thickness of, for example, 0.5 μm to 10 μm.

The negative current collector 31 is, for example, metal foil formed of a metal such as copper. The metal foil may be formed of any of various metals other than copper (e.g., stainless steel, nickel, aluminum, silver, gold, chromium, iron, tin, lead, tungsten, molybdenum, titanium, zinc, or an alloy containing any of these metals).

The negative active material layer 32 includes a binder composed primarily of resin, and a carbonaceous material serving as a negative active material. The negative active material layer 32 is applied as a coat to the lower face of the negative current collector 31. That is, the negative electrode 3 is a so-called coating electrode. The negative active material layer 32 faces the separator 4 in the up-down direction. The lower face of the negative active material layer 32 is in contact with the upper face of the separator 4. Examples of the aforementioned carbonaceous material of the negative active material layer 32 include graphite (natural graphite or artificial graphite), pyrolytic carbon, coke, resin fired bodies, mesophase microspheres, and mesosphere pitches. The negative electrode 3 may use a lithium-occluding material as the negative active material, instead of the carbonaceous material. Examples of the lithium-occluding material include silicon, aluminum, tin, iron, iridium, an alloy containing any of the aforementioned materials, an oxide containing any of the aforementioned materials, and a fluoride containing any of the aforementioned materials.

The negative current collector 31 has a thickness of, for example, 5 μm to 25 μm, preferably 8 μm to 20 μm, and more preferably 8 μm to 15 μm. The negative active material layer 32 has a thickness of, for example, 20 μm to 300 μm, preferably 30 μm to 250 μm, and more preferably 30 μm to 150 μm. By increasing the thickness of the negative active material layer 32, it is possible to increase the capacity of the active material per unit area and to increase the energy density of the lithium secondary cell 1. By reducing the thickness of the negative active material layer 32, it is possible to suppress deterioration of cell characteristics (in particular, an increase in resistance value) accompanying the repetition of charging and discharging.

Next, with reference to Table 1, the relationship among the penetration percentage of the conductive bonding layer 23 in the positive active material plate 22, the bonding strength between the positive active material plate 22 and the positive current collector 21, and the rate characteristics of the lithium secondary cell 1 will be described.

TABLE 1

| | Positive active material plate | | | Conductive adhesive | | | Penetration | Capacity | Bonding | Warp of |
|---|---|---|---|---|---|---|---|---|---|---|
| | Active material composition | Thickness (μm) | Porosity (%) | Binder type | Solvent | Viscosity (mPa · sec) | percentage (%) | ratio (%) | strength (N/10 mm) | negative electrode |
| Example 1 | $LiCoO_2$ | 90 | 30 | Acrylic | Water | 212 | 11.1 | 95.8 | 2.5 | Small |
| Example 2 | $LiCoO_2$ | 90 | 30 | Acrylic | Water | 78 | 55.6 | 85.4 | 3.1 | Small |
| Example 3 | $LiCoO_2$ | 90 | 30 | Acrylic | Water | 362 | 5.6 | 97.0 | 2.2 | Small |
| Example 4 | $LiCoO_2$ | 90 | 30 | Acrylic | Water | 42 | 77.8 | 80.3 | 3.2 | Small |
| Example 5 | $LiCoO_2$ | 90 | 30 | Polyamide-imide | NMP | 8500 | 77.8 | 80.3 | 3.2 | Medium |
| Comparative Example 1 | $LiCoO_2$ | 90 | 30 | Acrylic | Water | 743 | 2.2 | 97.8 | 1.8 | Small |
| Comparative Example 2 | $LiCoO_2$ | 90 | 30 | Acrylic | Water | 20 | 88.9 | 77.7 | 3.3 | Medium |
| Comparative Example 3 | $LiCoO_2$ | 90 | 30 | Polyamide-imide | NMP | 2050 | 88.9 | 77.7 | 3.3 | Large |

The conductive adhesive in Table 1 is the above-mentioned adhesive applied to the positive current collector 21 or the positive active material plate 22 in order to form the conductive bonding layer 23. In Examples and Comparative Examples in which "Acrylic" and "Water" are described in the columns of binder type and solvent of adhesive, an acrylic binder (type number: LB1000) manufactured by SHOWA DENKO K.K. was used as the adhesive, which contains an acrylic resin and water as an aqueous solvent. In Examples and Comparative Examples in which "polyamide-imide" and "NMP (N-methyl-2-pyrrolidone)" are described in the columns of binder type and solvent of adhesive, a polyamide-imide binder (type number: HR16NN) manufactured by Toyobo Co., Ltd. was used as the adhesive, which contains a polyamide-imide resin and an NMP solvent as an organic solvent.

The penetration percentage in Table 1 can be easily controlled by changing the viscosity of the above-mentioned conductive adhesive, the porosity of the positive active material plate 22, and the method of mounting the positive active material plate 22 on the conductive adhesive (for example, mounting the positive active material plate 22 while sucking it), the load at the time of mounting the positive active material plate 22 on the conductive adhesive, and the like. The penetration percentage and the bonding strength in Table 1 were measured by the above-mentioned method. The rate characteristics of the lithium secondary cell 1 indicate a 1.0C/0.2C capacity ratio (i.e., a ratio of 1.0C capacity to 0.2C capacity). The degree of warp of the negative electrode 3 was visually determined.

In Examples 1 to 5 and Comparative Examples 1 to 3, the active material composition of the positive active material plate 22 was $LiCoO_2$, the thickness was 90 μm, and the porosity was 30%. Although not described in the table, in Examples 1 to 5 and Comparative Examples 1 to 3, the negative active material layer 32 of the negative electrode 3 contains natural graphite as a carbonaceous material and polyvinylidene fluoride (PVDF) of 95.5% by weight as a binder.

In Examples 1 to 5, the penetration percentage of the conductive bonding layer 23 in the positive active material plate 22 was 5.6% to 77.8%. The capacity ratio indicating the rate characteristics of the lithium secondary cell 1 was 80% or more (80.3% to 97.0%), and the bonding strength between the positive active material plate 22 and the positive current collector 21 was 2.0 N/10 mm or more (2.2 N/10 mm to 3.2 N/10 mm). As the penetration percentage increased, the capacity ratio decreased and the bonding strength between the positive active material plate 22 and the positive current collector 21 increased.

On the other hand, in Comparative Example 1, the penetration percentage of the conductive bonding layer 23 in the positive active material plate 22 was less than 3% (2.2%), and the bonding strength between the positive active material plate 22 and the positive current collector 21 was as small as less than 2.0 N/10 mm (1.8 N/10 mm). In Comparative Examples 2 and 3, the penetration percentage was larger than 80% (88.9%), and the capacity ratio was as low as less than 80% (77.7%).

In Examples 1 to 4, as the penetration percentage increases, the warp of the negative electrode 3 also increases slightly. From the viewpoint of suppressing changes in the appearance of the lithium secondary cell 1, Examples 1 to 3 having a penetration percentage of 75% or less are preferable to Example 4.

Comparing Example 4 and Example 5, the warp of the negative electrode 3 in the case where the conductive bonding layer 23 is formed by using an acrylic binder containing water as an aqueous solvent is smaller than that in the case where the conductive bonding layer 23 is formed by using a polyamide-imide binder containing NMP as an organic solvent. The same applies to Comparative Examples 2 and 3. Comparing Comparative Example 1 and Comparative Example 2, as the penetration percentage increases, the warp of the negative electrode 3 increases.

Figure 6:
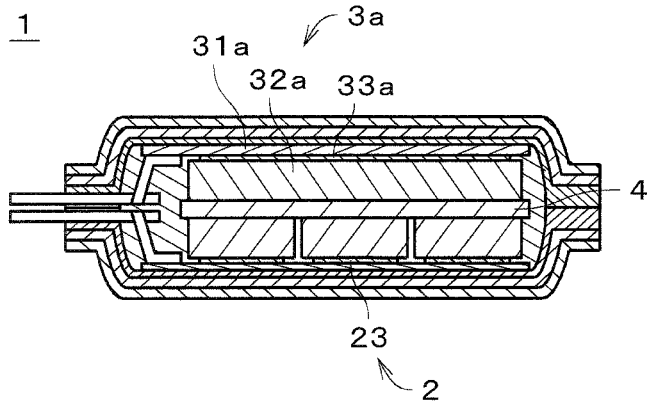
FIG. 6 is a sectional view of another lithium secondary cell.

The lithium secondary cell 1 may include a negative electrode 3a having a structure different from that of the negative electrode 3 as illustrated in FIG. 6, instead of the negative electrode 3 serving as a coating electrode. The negative electrode 3a has almost the same structure as the positive electrode 2 described above. Specifically, the negative electrode 3a includes a negative current collector 31a, a negative active material plate 32a, and a conductive bonding layer 33a. The negative current collector 31a is a sheet-like member having conductivity. For example, the negative current collector 31a is a member formed of a material similar to that of the negative current collector 31 described above and having the same structure as the negative current collector 31.

The negative active material plate 32a (i.e., the active material plate of the negative electrode 3a) is a relatively thin plate-like ceramic sintered body that contains a lithium composite oxide (e.g., lithium titanium oxide (LTO)). As the lithium titanium oxide, for example, $Li_4Ti_5O_{12}$ is used. The negative active material plate 32a is bonded to the lower face of the negative current collector 31a via the conductive bonding layer 33a. For example, the conductive bonding layer 33a is formed of a material similar to that of the conductive bonding layer 23 of the positive electrode 2 described above. The negative active material plate 32a faces the separator 4 in the up-down direction. The lower face of the negative active material plate 32a is in contact with the upper face of the separator 4.

The negative current collector 31a has a thickness of, for example, 5 μm to 25 μm, preferably 8 μm to 20 μm, and more preferably 8 μm to 15 μm. The negative active material plate 32a has a thickness of, for example, 10 μm to 300 μm, preferably 30 μm to 200 μm, and more preferably 30 μm to 150 μm. By increasing the thickness of the negative active material plate 32a, it is possible to increase the capacity of the active material per unit area and to increase the energy density of the lithium secondary cell 1. By reducing the thickness of the negative active material plate 32a, it is possible to suppress deterioration of cell characteristics (in particular, an increase in resistance value) accompanying the repetition of charging and discharging. The conductive bonding layer 33a has a thickness of, for example, 3 μm to 30 μm and preferably 5 μm to 25 μm.

In the example illustrated in FIG. 6, the negative active material plate 32a is a single plate-like member, but may be divided into a plurality of plate-like members (hereinafter, referred to as "active material plate elements"). In this case, each of the active material plate elements is bonded to the negative current collector 31a via the conductive bonding layer 33a. For example, the active material plate elements are arranged in a matrix (i.e., in grid form) on the negative current collector 31a. Each active material plate element has, for example, a generally rectangular shape in plan view. In plan view, the active material plate elements may have almost the same shape (i.e., almost the same form and almost the same dimensions), or may have different shapes. The active material plate elements are spaced from one another in plan view.

Next, with reference to Table 2, the relationship among the penetration percentage of the conductive bonding layer 33a in the negative active material plate 32a, the bonding strength between the negative active material plate 32a and the negative current collector 31a, and the rate characteristics of the lithium secondary cell 1 will be described. In Example 6 and Comparative Example 4 in Table 2, the structure of the positive electrode 2 is the same as that in Example 1 described above.

active material plate 32a on the conductive adhesive (for example, mounting the negative active material plate 32a while sucking it), the load at the time of mounting the negative active material plate 32a on the conductive adhesive, and the like.

The penetration percentage and the bonding strength in Table 2 were measured in the same manner as the penetration percentage and the bonding strength in the positive electrode 2 described above. The rate characteristics of the lithium secondary cell 1 indicates a 2.0C/0.2C capacity ratio (i.e., a ratio of 2.0C capacity to 0.2C capacity). Since the negative electrode 3a includes the negative active material plate 32a which is a sintered plate, the negative electrode 3a does not substantially warp.

In Example 6 and Comparative Example 4, the active material composition of the negative active material plate 32a was $Li_4Ti_5O_{12}$, the thickness was 100 μm, and the porosity was 40%. The thickness and porosity of the negative active material plate 32a were measured in the same manner as those of the positive active material plate 22.

In Example 6, the penetration percentage of the conductive bonding layer 33a in the negative active material plate 32a was 75.0%. The capacity ratio was 80% or more (83.3%), and the bonding strength between the negative active material plate 32a and the negative current collector 31a was 2.0 N/10 mm or more (3.2 N/10 mm). On the other hand, in Comparative Example 4, the penetration percentage of the conductive bonding layer 33a in the negative active material plate 32a was larger than 80% (90.0%), and the capacity ratio was as low as less than 80% (66.7%).

As described above, the lithium secondary cell 1 includes the positive electrode 2, the separator 4, the negative electrode (i.e., the negative electrode 3 or 3a), the electrolytic solution 5, and the sheet-like cell case 6. The separator 4 is arranged on the positive electrode 2 in a predetermined direction of superposition. The negative electrode is arranged on the separator 4 on a side opposite to the positive electrode 2 in the direction of superposition. The positive electrode 2, the negative electrode, and the separator 4 are impregnated with the electrolytic solution 5. The cell case 6 covers the positive electrode 2 and the negative electrode from both sides in the direction of superposition. The cell case 6 houses therein the positive electrode 2, the separator 4, the negative electrode, and the electrolytic solution 5.

TABLE 2

| | Negative active material plate | | | Conductive adhesive | | | Penetration percentage (%) | Capacity ratio (%) | Bonding strength (N/10 mm) | Warp of negative electrode |
|---|---|---|---|---|---|---|---|---|---|---|
| | Active material composition | Thickness (μm) | Porosity (%) | Binder type | Solvent | Viscosity (mPa · sec) | | | | |
| Example 6 | $Li_4Ti_5O_{12}$ | 100 | 40 | Polyamide-imide | NMP | 23000 | 75.0 | 83.3 | 3.2 | |
| Comparative Example 4 | $Li_4Ti_5O_{12}$ | 100 | 40 | Polyamide-imide | NMP | 3300 | 90.0 | 66.7 | 3.3 | |

The conductive adhesive in Table 2 is an adhesive that is applied to the negative current collector 31a or the negative active material plate 32a in order to form the conductive bonding layer 33a. The adhesive is the same as that in Example 5 and Comparative Example 3 except for the viscosity.

The penetration percentage in Table 2 can be easily controlled by changing the viscosity of the above-mentioned conductive adhesive, the porosity of the negative active material plate 32a, and the method of mounting the negative In the lithium secondary cell 1, one electrode (i.e., the positive electrode 2 or the negative electrode 3a) of the positive electrode and the negative electrode includes the sheet-like current collector (i.e., the positive current collector 21 or the negative current collector 31a) having conductivity, and the active material plate (i.e., the positive active material plate 22 or the negative active material plate 32a) that is a plate-like ceramic sintered body containing a lithium composite oxide. The active material plate is bonded to the current collector via the conductive bonding layer (the conductive bonding layer 23 or 33*a*). The active material plate is penetrated by the conductive bonding layer through a surface of the active material plate facing the current collector. The penetration depth of the conductive bonding layer in the active material plate with respect to the direction of superposition is 3% or more and 80% or less of a thickness of the active material plate.

As a result, in the lithium secondary cell 1, it is possible to achieve both ensuring the bonding strength of the active material plate to the current collector and suppressing deterioration of cell characteristics due to the conductive bonding layer. Specifically, the bonding strength between the active material plate and the current collector can be 2.0 N/10 mm or more. The capacity ratio (that is, a 1.0C/0.2C capacity ratio or a 2.0C/0.2C capacity ratio) indicating the rate characteristics of the lithium secondary cell 1 can be 80% or more.

As illustrated in FIG. 1, preferably, the one electrode described above is the positive electrode 2, and the negative electrode 3 includes the sheet-like negative current collector 31 having conductivity, and the negative active material layer 32 containing a carbonaceous material or a lithium-occluding material, the negative active material layer 32 being applied as a coat on the negative current collector 31. In this case, by setting the penetration percentage of the conductive bonding layer 23 in the positive active material plate 22 to 3% or more and 80% or less as above, the deformation of the negative electrode 3 which is the coating electrode can be suitably suppressed. As a result, deterioration of the appearance of the lithium secondary cell 1 due to the deformation of the negative electrode 3 can be suppressed. In addition, deterioration of cell characteristics and occurrence of short circuit due to the deformation of the negative electrode 3 can be suppressed.

As described above, it is preferable that the conductive bonding layer (i.e., the conductive bonding layer 23 or 33*a*) includes conductive powder; and a binder containing a resin and an aqueous solvent. Compared to the organic solvent, the aqueous solvent is easily vaporized at the time of manufacturing the lithium secondary cell 1 and the like. Thus, the residue in the lithium secondary cell 1 after manufacturing is reduced. This makes it possible to prevent the solvent in the conductive bonding layer of one electrode from coming into contact with and being absorbed by the other electrode in the lithium secondary cell 1. As a result, it is possible to further suppress the deterioration of cell characteristics due to the conductive bonding layer. It is also possible to suppress the deformation of the other electrode.

As described above, it is preferable that the resin contained in the conductive bonding layer (i.e., the conductive bonding layer 23 or 33*a*) is an acrylic resin. This makes it possible to suitably form the conductive bonding layer using an aqueous solvent. Thus, as described above, it is possible to suppress the deterioration of cell characteristics and the deformation of the other electrode due to the conductive bonding layer.

As described above, it is preferable that the active material plate (i.e., the positive active material plate 22 or the negative active material plate 32*a*) has a porosity of 25% or more and 45% or less. Thereby, the penetration percentage of the conductive bonding layer in the active material plate can be easily set to 3% or more and 80% or less.

Although the above-mentioned lithium secondary cell 1 is thin, it can achieve both ensuring the bonding strength of the active material plate to the current collector and suppressing the deterioration of cell characteristics due to the conductive bonding layer. Therefore, the lithium secondary cell 1 is particularly suitable as a power supply source of a thin device, that is, a sheet-like device or a device having flexibility (for example, a smart card).

The lithium secondary cell 1 described above may be modified in various ways.

For example, the structure of the positive active material plate 22 of the positive electrode 2 may be modified in various ways. For example, the average inclination angle of the primary particles with a layered rock-salt structure in the positive active material plate 22 may be greater than 30° or may be 0°. Alternatively, the primary particles may have a structure other than the layered rock-salt structure.

In the lithium secondary cell 1 which is provided with the negative electrode 3*a* including the negative active material plate 32*a*, the positive electrode 2 may be a coating electrode in which the positive current collector 21 is coated with a positive active material that contains a binder composed primary of resin and a positive active material.

The lithium secondary cell 1 may be used as a power supply source of a device having flexibility other than a smart card (e.g., card-type device) or a sheet-like device (e.g., a wearable device provided on clothes or the like or a body-mounted device). The lithium secondary cell 1 may also be used as a power supply source of any of various targets (e.g., an IoT module) other than the devices described above.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The lithium secondary cell according to the present invention is applicable in various fields such as a field in which lithium secondary cells are used as power supply sources of smart cards having an arithmetic processing function and the like.

REFERENCE SIGNS LIST

1 Lithium secondary cell
2 Positive electrode
3, 3*a* Negative electrode
4 Separator
5 Electrolytic solution
6 Cell case
21 Positive current collector
22 Positive active material plate
23 Conductive bonding layer
31, 31*a* Negative current collector
32 Negative active material layer
32*a* Negative active material plate
33*a* Conductive bonding layer

The invention claimed is:
1. A lithium secondary cell comprising:
a positive electrode;
a separator arranged on said positive electrode in a predetermined direction of superposition;

a negative electrode arranged on said separator on a side opposite to said positive electrode in said direction of superposition;

an electrolytic solution with which said positive electrode, said negative electrode, and said separator are impregnated; and a sheet-like cell case that covers said positive electrode and said negative electrode from both sides in said direction of superposition and houses therein said positive electrode, said separator, said negative electrode, and said electrolytic solution, wherein one electrode of said positive electrode and said negative electrode includes:

a sheet-like current collector having conductivity; and an active material plate that is a plate-like ceramic sintered body containing a lithium composite oxide, said active material plate being bonded to said current collector via a conductive bonding layer, said conductive bonding layer penetrates into said active material plate through an entire surface of said active material plate facing said current collector, a penetration depth of said conductive bonding layer in said active material plate with respect to said direction of superposition is 3% or more and 80% or less of a thickness of said active material plate.

2. The lithium secondary cell according to claim 1, wherein said one electrode is said positive electrode, and said negative electrode comprises:

a sheet-like negative current collector having conductivity; and a negative active material layer containing a carbonaceous material or a lithium-occluding material, said negative active material layer being applied as a coat on said negative current collector.

3. The lithium secondary cell according to claim 1, wherein said conductive bonding layer includes:

conductive powder; and a binder containing a resin and an aqueous solvent.

4. The lithium secondary cell according to claim 3, wherein said resin contained in said conductive bonding layer is an acrylic resin.

5. The lithium secondary cell according to claim 1, wherein said active material plate has a porosity of 25% or more and 45% or less.

6. The lithium secondary cell according to a claim 1, being used as a power supply source of a sheet-like device or a device having flexibility.

7. The lithium secondary cell according to claim 6, being used as a power supply source of a smart card that is said device having flexibility.

* * * * *